(12) United States Patent  
Chapman

(10) Patent No.: US 6,626,117 B1  
(45) Date of Patent: Sep. 30, 2003

(54) WHEEL SYSTEM FOR A CAMERA DOLLY

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 0 days.

(21) Appl. No.: 09/838,025

(22) Filed: Apr. 19, 2001

Related U.S. Application Data

(63) Continuation-in-part of application No. 09/506,974, filed on Feb. 18, 2000, now Pat. No. 6,349,994.

(51) Int. Cl.[7] ............................................... B61F 15/00
(52) U.S. Cl. .................... 105/218.1; 105/169; 295/36.1
(58) Field of Search ............................ 105/218.1, 169, 105/170, 178, 215.1; 295/36.1, 43, 8.5, 33; 301/111

(56) References Cited

U.S. PATENT DOCUMENTS

| | | | | |
|---|---|---|---|---|
| 2,544,924 A | * | 3/1951 | Herold | 104/306 |
| 3,445,958 A | * | 5/1969 | Johnson et al. | 446/465 |
| 3,610,659 A | * | 10/1971 | Gerarde | 280/169 |
| 3,807,761 A | * | 4/1974 | Brilando et al. | 280/279 |
| 4,103,922 A | * | 8/1978 | Brilando | 280/279 |
| 4,254,532 A | * | 3/1981 | Hager | 16/20 |
| 4,711,459 A | * | 12/1987 | Liu | 280/279 |
| 5,463,855 A | * | 11/1995 | Johnson et al. | 56/17.2 |
| 5,609,108 A | * | 3/1997 | Chapman | 105/170 |
| 5,791,257 A | * | 8/1998 | Konop | 105/163.1 |
| 5,795,037 A | * | 8/1998 | Hagelthorn | 301/105.1 |
| 5,823,555 A | * | 10/1998 | Ashman | 280/279 |
| 6,082,746 A | * | 7/2000 | Wrike | 280/11.22 |
| 6,131,936 A | * | 10/2000 | Eguchi et al. | 280/339.4 |

* cited by examiner

Primary Examiner—S. Joseph Morano  
Assistant Examiner—Frantz F. Jules  
(74) Attorney, Agent, or Firm—Perkins Coie LLP

(57) ABSTRACT

In an improved track wheel system for a camera dolly, a kingpin is pivotably attached to the dolly chassis and an axle is attached to the kingpin. A bushing is placed on a first section of the axle, a wheel bearing is attached to the bushing, and a first track wheel is attached to the wheel bearing. A spacer is placed on a second section of the axle and a stop is attached to the end of the axle. The stop preferably comprises a quick release clip which can be easily removed and replaced to remove the spacer from the axle. With the spacer removed, the first track wheel is free to shift laterally on the axle. A second track wheel of the same construction is attached to an opposite side of the kingpin.

16 Claims, 5 Drawing Sheets

WHEEL SYSTEM FOR A CAMERA DOLLY

This application is a Continuation In Part of U.S. patent application Ser. No. 09/506,974, filed Feb. 18, 2000, and now U.S. Pat. No. 6,349,994.

BACKGROUND OF THE INVENTION

1. Field of the Invention

The field of the present invention is camera dollies.

2. Background

Camera dollies are used in the television and motion picture industries to support and maneuver a camera. Typically, the camera dolly is on wheels and has an arm to raise and lower the camera. The camera dolly is generally moved by dolly operators or "grips", to properly position the camera to follow the film or video sequence.

The camera dolly must support and maneuver the camera with a minimum of vibration or shock to avoid degrading the filmed image quality. Consequently, camera dollies must be designed, manufactured, and maintained with precision. When used on a relatively smooth surface, such as studio floors, the camera dolly is generally supplied with pneumatic tires, or smooth precision tires of various materials, so that the camera may be smoothly supported and moved, even over minor cracks or bumps in the floor surface.

When the supporting ground surface is bumpy and irregular (e.g., when the dolly is used outdoors on sand, irregular ground, a poor quality paved surface, etc.,) track is assembled on the ground to provide a smooth rolling surface for the dolly. However, for use on track, many dollies require that the pneumatic ground wheels be replaced with stiffer track wheels. Other camera dollies require the installation of track wheel attachments, which are provided as accessories to the dolly. While these techniques have met with varying degrees of success, they have certain disadvantages. For example, it may be time consuming and labor intensive to install track wheels. During production of a motion picture or television program, even a delay of five minutes (e.g., to install track wheels) can be very costly, as all the actors, camera operators, lighting, sound and special effects professionals, the director, and the various crew members must wait until the camera dolly is set up for the track filming sequence. Accordingly, it is advantageous to have equipment which can be quickly set up for the desired film or video sequence. In addition, track wheels or track wheel attachments must often be shipped and stored separately from the camera dolly since they are not permanently attached to the dolly. This requirement further complicates the logistics of television and film production.

Where a camera dolly is moved over curved track, the lateral spacing between the left and right wheels (or sets of wheels) must be allowed to change slightly, to accommodate the wheel position geometry on curved track. In addition, the wheel (or wheel sets) on the inside of the curve must be turned or angled more sharply than the outside wheels. These requirements must be accommodated for good dolly performance, and they complicate dolly design considerations.

U.S. Pat. No. 5,609,108, incorporated herein by reference, discloses one type of system that may be used to make using camera dollies with track more convenient. In this design, a camera dolly includes a kingpin pivotably supported on a chassis. A kingpin tube extends laterally from the kingpin and an axle is supported within the kingpin tube by two axle pins, thus allowing the axle to pivot slightly on the axle pins. A wheel bearing supporting a track wheel is mounted on the axle. A knob is threaded into the end of the axle such that the knob, when in a first position limits the lateral movement of the track wheel and the pivoting of the axle. In the second position, the track wheel may shift laterally and the axle may pivot, thus permitting the track wheels to be used on curved track without binding. However, under certain circumstances, this design may be too bulky to meet the needs of the dolly operator and film crew, especially because the knob protrudes out beyond the overall envelope in volume of the dolly. Threading the knob in and out can also be time consuming.

Accordingly, there is a need for an improved track wheel system for camera dollies.

SUMMARY OF THE INVENTION

The present invention is directed to an improved track wheel system for a camera dolly. In a first aspect, a kingpin is pivotably attached to the dolly chassis. An axle is attached to the kingpin. A wheel is supported on the axle. A spacer is placed on the axle between the end of the axle and the wheel. A stop, preferably a quick release clip, is attached to the end of the axle. In using a quick release clip, the spacer may be removed quickly and easily. After removing the spacer, the quick release clip is replaced. Without the spacer, the track wheel is free to shift laterally on the axle.

By providing a track wheel system with track wheels that can shift laterally on the axle, the system allows the camera dolly to roll on curved track without binding. The dolly may also be conveniently used on ground as the installation of the spacer prevents the track wheel from shifting. Thus, the track wheel system for the camera dolly disclosed herein does not require the wheels to be changed when being used on ground or track. The spacer can be quickly removed or replaced, minimizing the time required to convert the dolly for use on track. Only two wheel spacers, preferably on the same side of the dolly, need be removed. This saves time and works well to stabilize the dolly.

BRIEF DESCRIPTION OF THE DRAWINGS

In the drawings, wherein the same reference numerals refer to the same element.

DETAILED DESCRIPTION OF THE PREFERRED EMBODIMENTS

Figure 1:
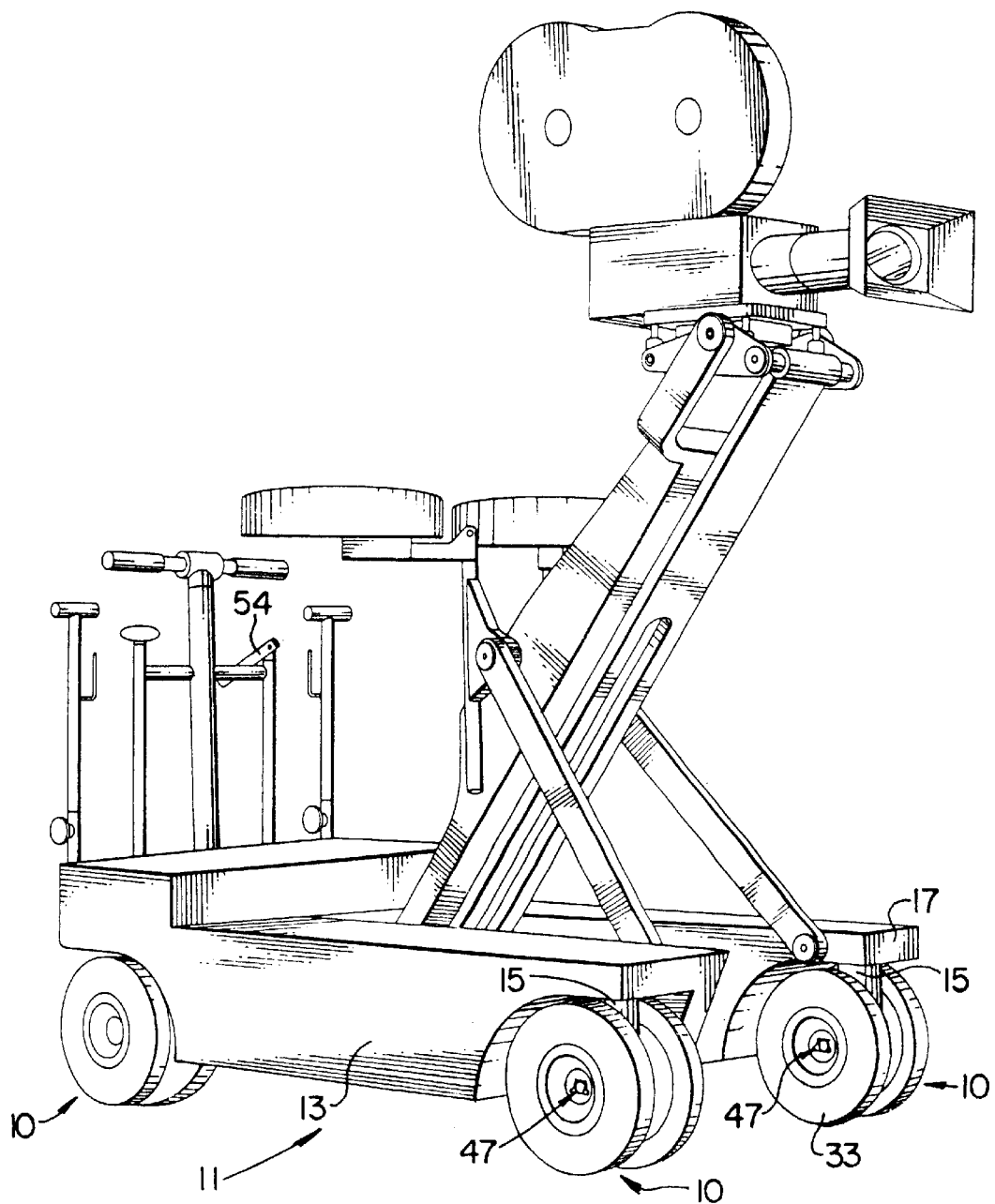
FIG. 1 is a perspective view of the present wheel assembly on a camera dolly.
Figure 2:
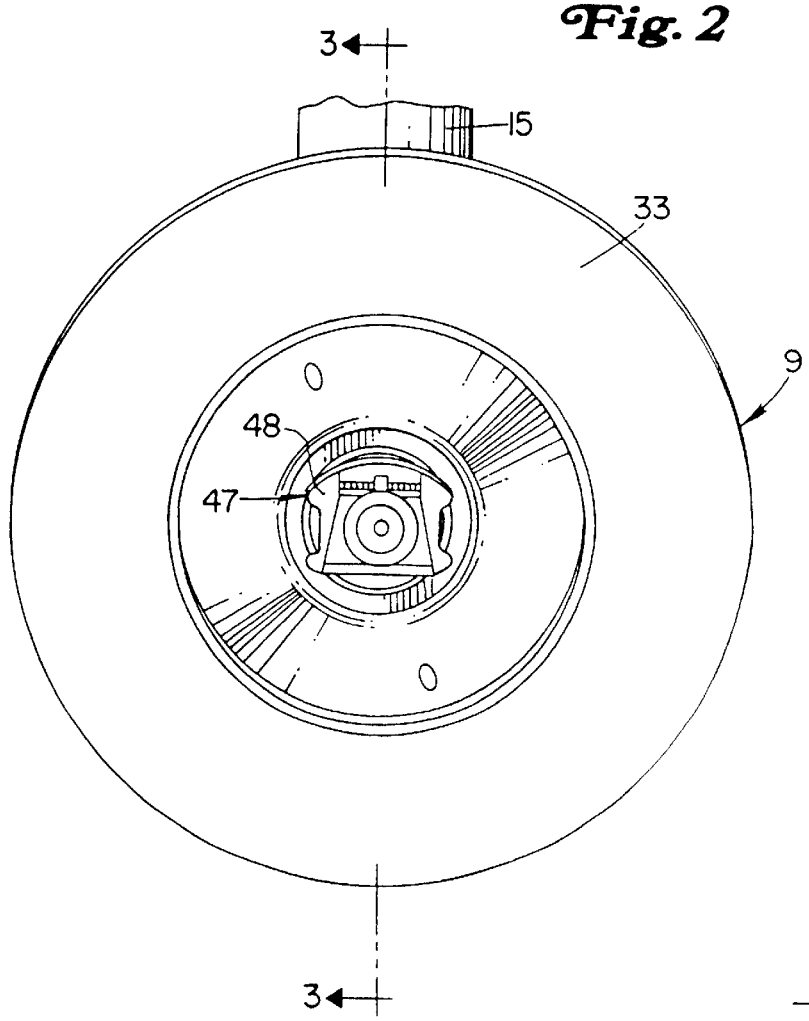
FIG. 2 is an enlarged view of the wheel assembly shown in FIG. 1.

Turning in detail to the drawings, FIG. 1 illustrates a camera dolly 11 with the improved wheel assemblies 10. The dolly 11 has a frame 13 with a kingpin 15 pivotably attached to a frame extension 17 integral with the frame 13.

The kingpin 15 extends upwardly into the frame extension 17 and is linked to sprockets 16 and chains or belts forming part of the steering system of the camera dolly. For use on the ground, the steering system, which is linked to the kingpins at each of the four corners of the camera dolly, steers the dolly in a crab steering mode; or a corrective steering angle steering mode; or in a round steering mode as described, for example, in U.S. Pat. No. 6,135,465. When used on track, the track itself guides or steers the wheels. The steering system is then inactive is disengaged from the wheels.

Figure 4:
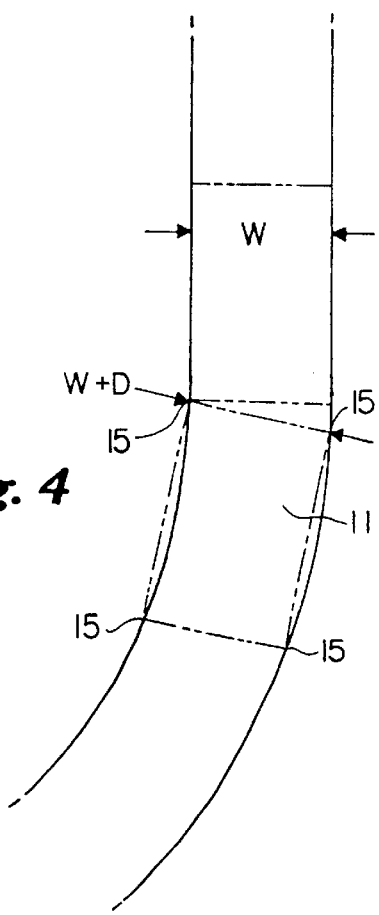
FIG. 4 is a geometric construction illustrating lateral wheel displacement on curved track.

FIG. 4 is a schematic drawing which illustrates how the lateral distance or width W between left and right kingpin centers (track base) must increase as the dolly moves onto curved track. The corners of the dolly, shown in dotted lines as a rectangle, represent kingpin positions. For track having an 8 foot (244 cm) radius (measured at the centerline of the inner rail), the required lateral shift or increase D in the distance between kingpin centers is 0.39 inches (1.0 cm) for a typical dolly wheel-base. For more sharply curved track, D must be even greater. Without allowing for the increase from W to W+D, the wheels will tend to bind or wedge on the curved track. This makes pushing the dolly difficult or impossible, and can also generate unacceptable noise and vibration.

Figure 3:
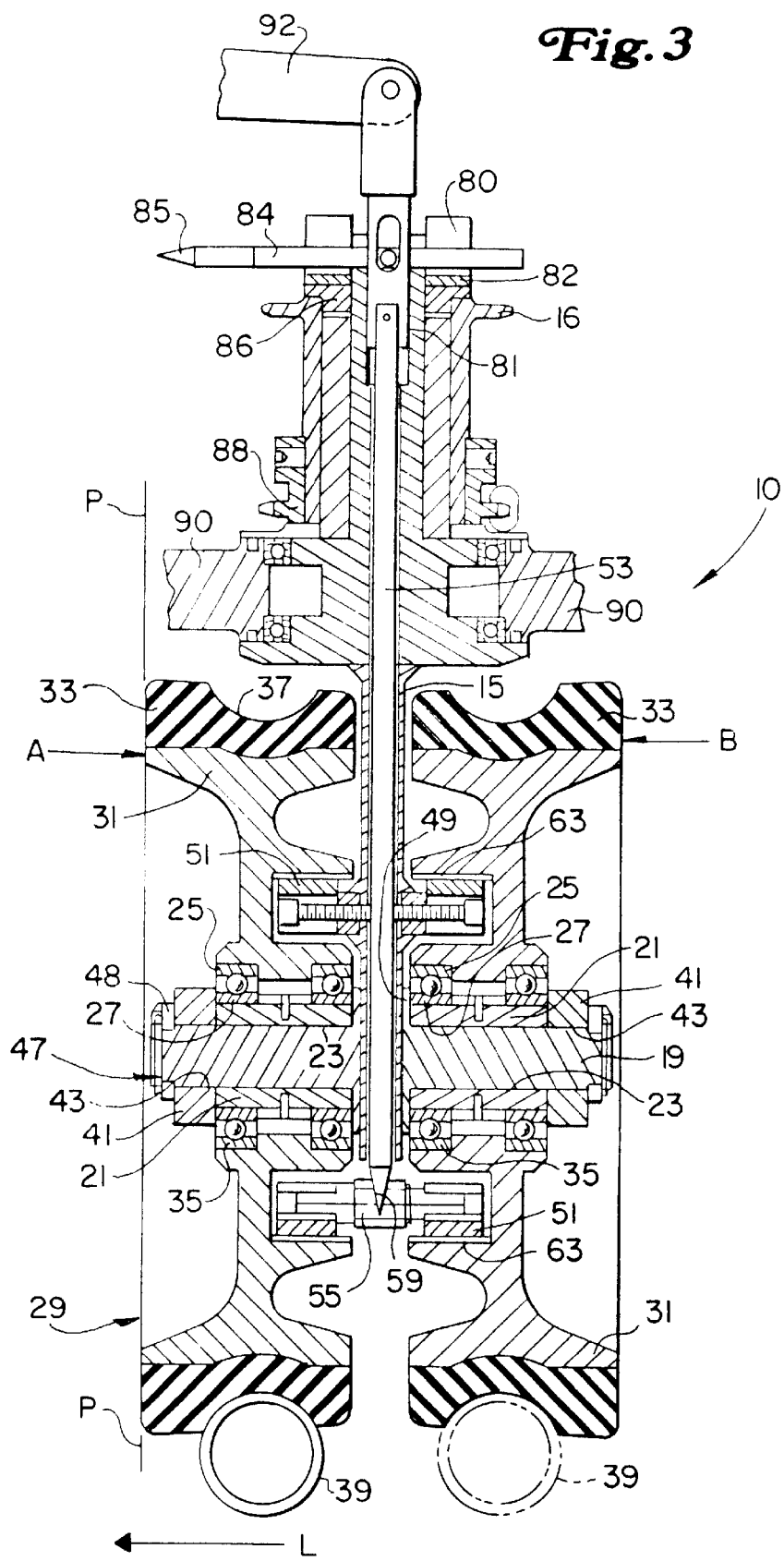
FIG. 3 is a section view thereof taken along line 3—3 of FIG. 2.

Referring to FIG. 3, the wheel assembly 18 is symmetrical, side to side, about the center line or axis A—A. Consequently, the components and assemblies on opposite sides of the kingpins 15 are the same. Axles 19 are attached, preferably welded, to both of the broad flat sides of each of the four kingpins 15. A DU bushing 21, or more preferably a linear ball wheel bearing or an equivalent such as a needle bearing, is installed over a first or inner section of the axle 19. A wheel bearing 25 has an inner race 27 pressed on or secured over the bushing 21. In an alternative embodiment, the bushing 21 and the wheel bearing 25 may form an integral combination bearing. A wheel 29 and a tire 33 on the wheel 29, is attached to the wheel bearing 25. The wheel 29 is secured to the outer race 35 of the wheel bearing 25. The wheel 29 is preferably metal, such as aluminum. The tire is preferably made of a relatively hard tire material, e.g., rubber, urethane, etc., and is secured on and supported by the wheel hub 31. The tire 33 has a groove 37 adapted to match the radius of the round track 39. The groove 37 may also be shaped to fit square track.

A spacer 41 is installed over an outer or second section 43 of the axle 19. A quick release clip 47, such as described in U.S. Pat. No. 6,349,994, incorporated herein by reference is attached at the end of the axle 19. Other types of quick release clips and methods of attaching such clips to the axle 19 may also be used. The shoulder 48 of the quick release clip 47 extends beyond the outer diameter of the axle 19 and bears against the spacer 41. The spacer 41, in turn, bears against one side of the inner race 27 of the wheel bearing 25. The other side of the inner race 27 bears against the axle shoulder 49. Thus, the quick release clip 47 acts as a stop or lock against lateral movement by the spacer 41 and the wheel 29. In the preferred embodiment, the quick release clip 47 is entirely within the profile P of the wheel 29, so that it does not add any additional width to the dolly. In contrast, in the prior art wheel assembly shown in FIG. 6, the handle 300 extends out beyond the profile of the wheel, where it is a potential obstacle to movement around the dolly and requires more room to operate the dolly.

Referring still to FIG. 3, a pair of cam levers 80 are pivotably mounted on a cam pin 84 extending through an upper tubular section 81 of the kingpin 15. The cam levers 80 have lobes which bear against a hardened washer 82 on top of a collar 86 also supported around the tubular section 81 of the kingpin 15. The cam lobes preferably sit in a groove in the washer 82 to increase the contact area between the cam lobes and the washer 82. The cam levers 80 can pivot on the cam pin 84 independently of each other. The collar 86 bears against the top surface of an upper sprocket 16 which in turn bears against the top surface of a lower sprocket 88. The lower sprocket is supported from below by a flange on the kingpin 15. The sprockets 16 and 88 are part of the camera dolly steering system, as is well known in the art. The kingpin 15 is supported within kingpin support frame 90 which is part of the dolly chassis.

For operation on the ground, the steering system is engaged to all of the four kingpins 15. Specifically, the cam levers 80 in the engaged or on position. The cam lobes on the cam levers 80 push down forcefully on the washer 82, collar 86, and the sprockets 16 and 88. This clamps or locks the sprockets together with the kingpin 15. Consequently, movement of the steering system chains (via a steering handle bar at the rear of the dolly) on the sprockets steers the kingpins. For operation on track, where each kingpin must be allowed to independently conform to the track geometry, the steering system is disengaged by releasing the cam levers 80. Specifically, the cam levers are flipped over by about 180 degrees. This pivots the cam lobes away from the washer 82, and unclamping or freeing up the sprockets from the kingpin 15. In this released position, the kingpin can turn without turning the sprockets, so that the dolly steering system is disengaged from the kingpin and wheels, for operation on track. The dolly is preferably provided with a cam lever tool, to assist in operating the cam levers. A pointer 85 on the end of the pin 84 aids in aligning the kingpin, before the cam levers are locked down to re-engage the steering system. Proper (zero degree) wheel alignment is achieved by turning the kingpin until the pointer aligns with an alignment mark or line on the chassis. This provides visual confirmation of proper alignment. The cam levers are the locked down, locking the kingpin into proper alignment for use with the steering system.

Figure 5:
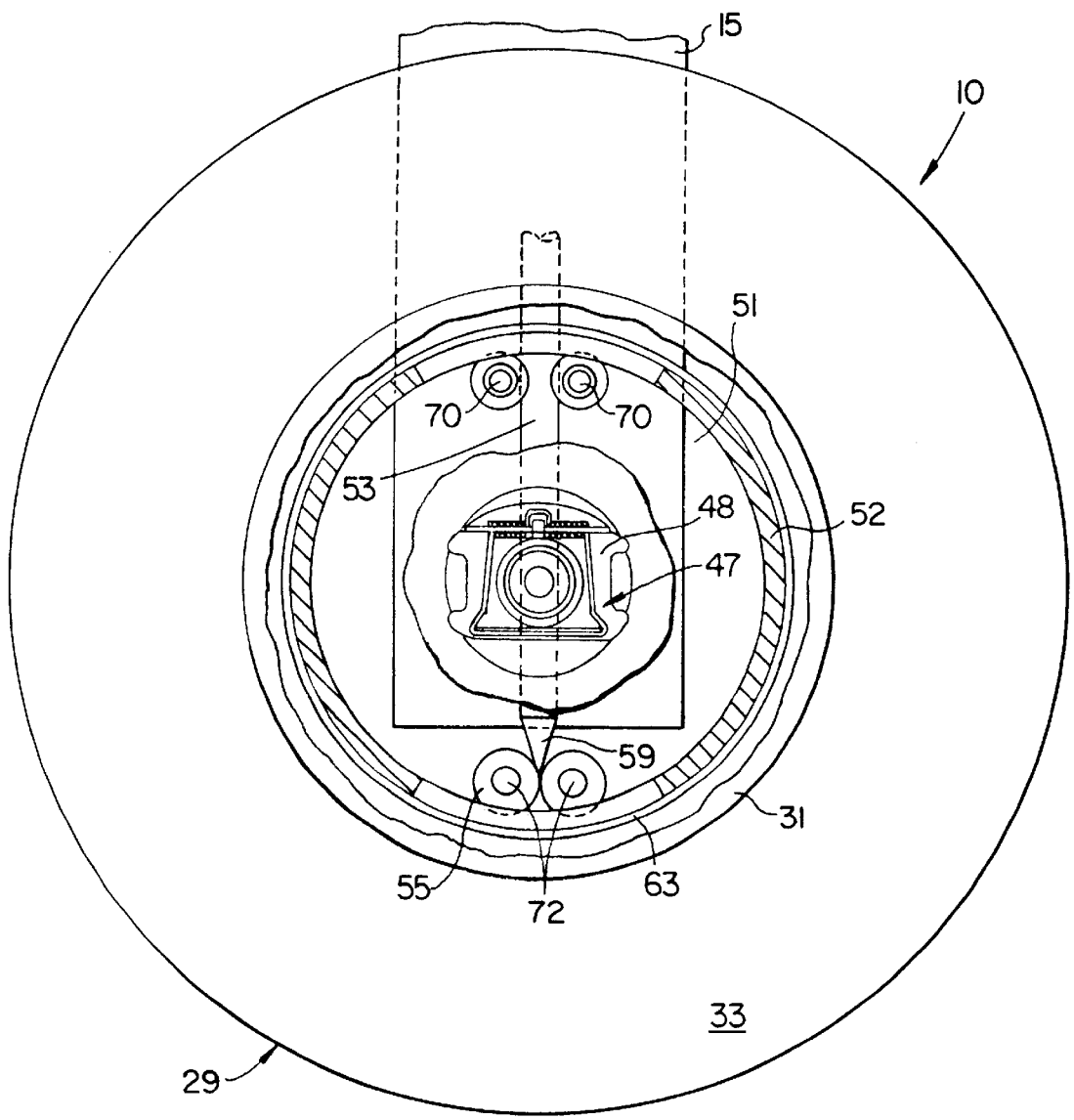
FIG. 5 is a front view of the wheel assembly shown in FIGS. 2 and 3, with additional details shown.

Referring now to FIGS. 3 and 5, each rear wheel 29 has an internal split brake ring 51 which can be actuated by a plunger 53 within the kingpin, via rollers 55. Brake shoes 52 are attached to the brake ring 51, as shown in FIG. 5. The brake ring is attached to the kingpin via ring bolts 70. The rollers 55 are attached to the split brake ring 51 by roller bolts 72. The plunger 53 is connected via a mechanical linkage 92 to a brake lever 54 at the rear of the dolly, next to the other controls. The plunger 53 does not pivot or rotate. It moves vertically in a bore in the kingpin 15. The kingpin 15, washer 82, collar 86, and sprockets 16 and 88 can rotate around the plunger 53. The brake is actuated by pushing down on the brake lever 54, which drives the linkage 92 to force the ramp or angled end 59 of the plunger 53 down, pushing the rollers 55 outwardly. This moves the brake shoes 52 outwardly against the inside surface of the wheel hub 31. The end 59 of the plunger 53, when moved downwardly, drives the rollers 55 apart by pushing the ends of the brake ring 51 apart. The brake ring forms a continuous circle or ring, except at the bottom, where it is open or split. Both sides of the brake ring 51 flex outwardly at the bottom, when the brake is actuated. The top of the ring 51, at the bolts 70, is continuous, and does not flex or move significantly, as it is bolted on to the kingpin.

The split ring 51 is preferably aluminum. The brake shoes 52 are preferably polyurethane, with the polyurethane wheel bearing against the wheel 29 during braking. In the preferred embodiment, a thin steel ring 63 is pressed into the wheel 29 to give added hardness on the braking surface.

As shown in FIG. 3, brake shoes 51 are provided on both sides of the wheel assembly 10 at the rear wheels.

Consequently, both rear wheels can be braked, to slow dolly movement, or to hold the dolly in place, on the ground, or on track. In addition, braking is available regardless of whether the wheel on side A, or the wheel on side B, as shown in FIG. 3, is on the track 39. (The track has one rail at each side of the dolly, so that either wheel A or wheel B, but not both, are on the track 39, at each of the four wheel assemblies 10).

Figure 6:
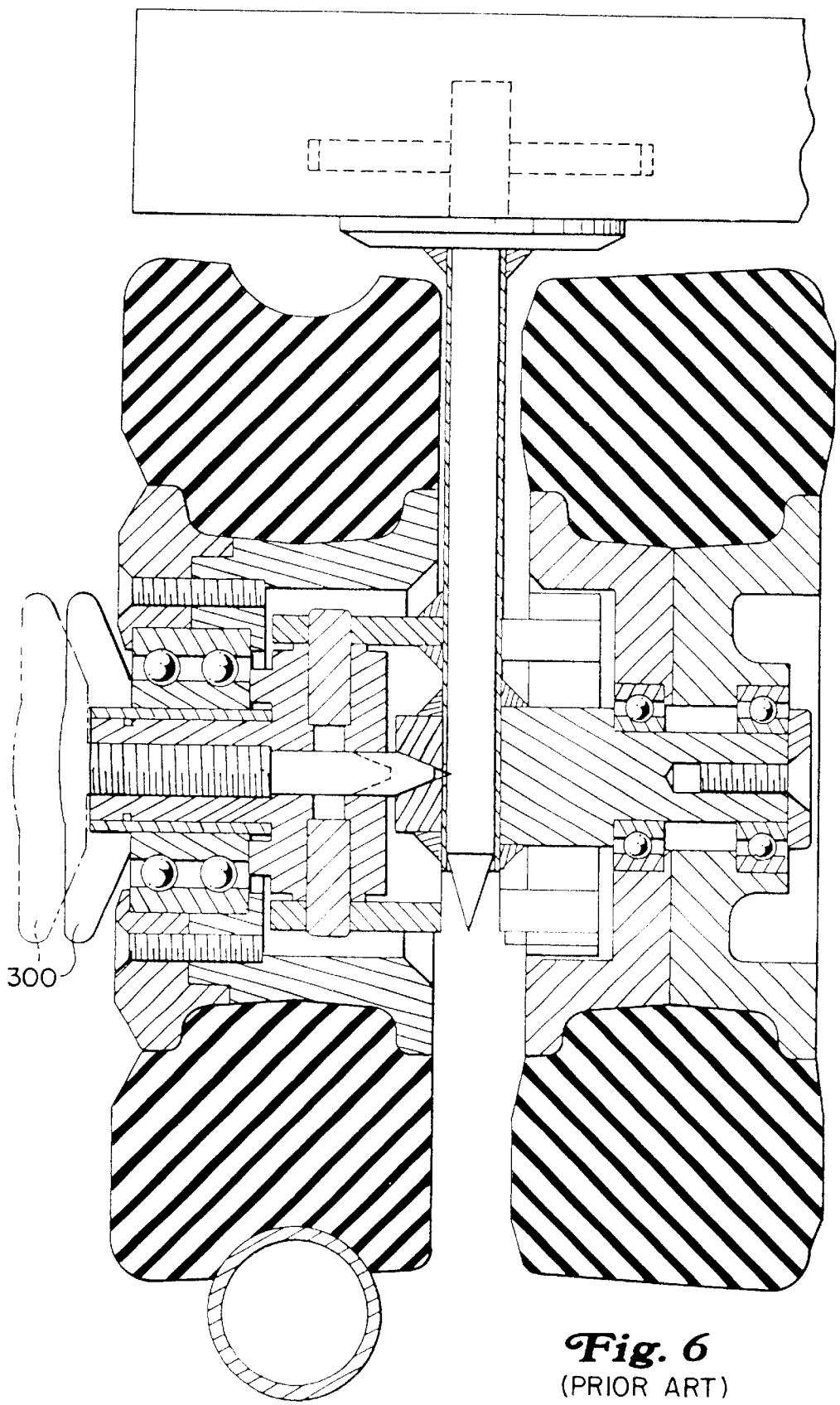
FIG. 6 is a section view of a prior art wheel assembly.

In contrast, in the wheel assembly shown in FIG. 6, braking is not available when on track, because the outside wheel which is on the track has no brake. The pivoting axle assembly shown therein prevents installation of a brake on that wheel. While the inside wheel in FIG. 6 has a brake, when the dolly is on track, the inside wheel is off the ground suspended in air, so that no braking can be achieved.

In the preferred embodiment, each tire 33 has a tapered outer diameter, with the largest diameter positioned furthest from the kingpin 15. Only the outer edge of each wheel contacts ground when the dolly is used on the ground. The reduced surface contact of the wheels helps increase stability when passing over grooves and bumps. It also helps reduce the amount of rotational friction encountered when steering the dolly on the ground, thus making the dolly easier to push and steer.

Unlike some of the wheel assemblies in the prior art, when used on ground or on track, the orientation of the kingpin 15 is irrelevant because both wheels are the same. For use on standard track, the kingpins 15 (at each of the four corners of the dolly 11) are turned to place one of the wheels to the outside. If straight track is being used, the spacer 41 is left in place. With the spacer 41 in place, the shoulder 48 of the quick release clip 47 causes the spacer 41 to clamp the inner race 27 of the wheel bearing 25 against the axle shoulder 49. Accordingly, with the spacer in place, the track wheel 29 cannot shift laterally (in the direction L in FIG. 3). Hence, in this manner the track wheel system acts as a conventional wheel.

However, for use on curved track, the clip 47 is removed, the spacer 41 is removed, and the quick release clip 47 is replaced prior to any further operation of the dolly 11. With the spacer removed, the bushing 21, and thus the wheel bearing 25 and the wheel 29, may slide laterally on the axle in the direction L. The shifting of the wheel 29 allows the distance between the left and right side wheels to change, to accommodate the required increased lateral spacing between the left and right side wheels, as shown in FIG. 4.

With the track wheel 29 free to shift laterally, the dolly 11 may move along curved track 39 without binding, as long as the kingpins 15 are permitted to rotate by releasing cams 80. To achieve proper performance on track, two spacers are removed, and the cams 80 are released, to disengage the steering system, so that the kingpins and wheels can continuously conform to the steering angles required on curved track. In rolling on curved track 39, the track wheels shift laterally and the kingpins 15 rotate as needed as the dolly 11 follows the curvature of the curved track 39. On an 8 foot radius track, as shown in FIG. 4, the kingpin must turn approximately 11 degrees to follow the curvature. In the preferred embodiment, the spacer 41 occupies about ¼–¾ inch, (0.6–2 cm) and preferably approximately ½ inch (1.3 cm) of the axle 19, although spacers of different sizes may be used so long as the axle 19 is appropriately sized to S accommodate the spacer. The preferred width W of the spacer 41 will vary with the dolly geometry. With the spacer 41 removed, the wheels 29 have enough space for lateral movement to accommodate a 5 foot (150 cm) radius track (typically the smallest used in the motion picture industry).

Accordingly, the track wheel system 14 allows the dolly 10 to be used on ground or track without the need for separate track wheels or attachments. The changeover from ground to track operation is very fast, and may be achieved without using tools (except to unlock the cams 80). For use only on straight track or on ground, the spacer 41 is left in place or installed, as required, and secured using the quick release clip 47.

As the wheel assembly is symmetrical, side to side, it is not necessary to rotate the wheel assembly 10 to move either side of the wheel to the outside. This simplifies and expedites transitioning the dolly from ground to track operation. In contrast, the prior art wheel assembly shown in FIG. 6, requires the knob 300 to be on the outside, which may require time consuming reorientation of the wheel assembly, and also makes the dolly wider.

In general, allowing both the left and right sides at the front or back of the dolly to shift laterally permits too much lateral shift in the dolly. Preferably, only one track wheel system 14 is used at the front and at the rear of the dolly 10, as it is unnecessary and undesirable to allow the track wheels on both the left and right side of the dolly to shift laterally (in the direction L). Lateral wheel movement is achieved by removing the spacers 41 at diagonally opposite corners of the dolly, or by removing the spacers 41 on one side only, at the front and back wheel sets.

Thus, an improved wheel system for a camera dolly is disclosed. While embodiments of this invention have been shown and described, it would be apparent to those skilled in the art that many more modifications are possible without departing from the inventive concepts herein. The invention, therefore, is not to be restricted except in the spirit of the following claims.

What is claimed is:

1. A camera doily comprising:
   a chassis;
   a kingpin pivotably supported on the chassis in a substantially vertical orientation;
   an axle connected to the kingpin substantially at a midpoint of the axle;
   a first wheel rotatably attached to the axle on a first side of the kingpin;
   a removable stop mechanism connected to an end of the axle; and
   a spacer on the axle between the stop mechanism and the first wheel, the spacer held into contact against the first wheel by the removable stop mechanism such that the spacer and the first wheel are prevented from shifting along the axle, and with the spacer removable from the axle by temporarily removing the stop device from the axle, to allow the first wheel to shift along the axle, during use of the camera dolly on curved track.

2. The camera dolly of claim 1 further comprising a bushing on the axle, the bushing having a wheel bearing thereon, the first wheel supported on the wheel bearing.

3. The camera dolly of claim 2, wherein the wheel bearing includes an inner race in contact with the spacer, and the stop mechanism includes a shoulder in contact with the spacer.

4. The camera dolly of claim 1, wherein the removable stop mechanism comprises a quick release clip.

5. The camera dolly of claim 1 further comprising a second wheel rotatably attached to the axle on a second side of the kingpin.

6. The camera dolly of claim 1 further comprising a tire on the first wheel, the tire having a groove therein configured to engage a track.

7. The camera dolly of claim 1, wherein the spacer has an axial length from 0.25 to 0.75 inches.

8. The camera dolly of claim 1, wherein the stop mechanism is disposed within a profile of the first wheel in a direction of rotation of the first wheel.

9. A camera dolly comprising:
a chassis;
a kingpin pivotably supported on the chassis;
an axle connected to the kingpin substantially at a midpoint of the axle;
a first wheel rotatably attached to the axle on a first side of the kingpin;
a second wheel rotatably attached to the axle on a second side of the kingpin;
a first brake on the first wheel;
a second brake on the second wheel;
a removable stop mechanism connected to an end of the axle; and
a spacer on the axle between the stop mechanism and the first wheel, the spacer held into contact against the first wheel by the removable stop mechanism such that the spacer and the first wheel are prevented from shifting along the axle, and with the spacer removable from the axle by temporarily removable the stop device from the axle, to allow the first wheel to shift along the axle, during use of the camera dolly on curved track.

10. The camera of claim 9 further comprising a first tire on the first wheel, the first tire having a groove therein configured to engage a straight track and a curved track.

11. The camera dolly of claim 10 further comprising a second tire on the second wheel, the second tire having a groove therein configured to engage a straight track and a curved track.

12. The camera dolly of claim 9, wherein the removable stop mechanism comprises a quick release clip, the spacer readily removable from the axle when the quick release clip is removed from the axle.

13. A camera dolly comprising:
a chassis;
a kingpin pivotably supported on the chassis;
a wheel rotatably connected to the axle laterally from the kingpin;
a removable quick release clip connected to an end of the axle; and
a spacer on the axle positioned between and abutting against the quick release clip and the wheel such that the wheel is prevented from shifting laterally along the axle.

14. The camera dolly of claim 13 wherein the quick release clip includes a shoulder extending beyond an outer diameter of the axle such that the shoulder bears against the spacer when the quick release clip and the spacer are located on the axle.

15. The camera dolly of claim 13 wherein the quick release clip is deposed within a profile of the wheel in a direction of rotation of the wheel.

16. A camera dolly comprising:
a chassis;
a kingpin pivotably supported on the chassis in a substantially vertical orientation;
an axle connected to the kingpin substantially at a midpoint of the axle;
a first wheel rotatably attached to the axle on a first side of the kingpin;
a second wheel rotatably attached to the axle on the second side of the kingpin;
a brake mechanism on each of the first and second wheels;
a removable stop mechanism connected to an end of the axle; and
a spacer on the axle between the stop mechanism and the first wheel, the spacer held into contact against the first wheel by the removable stop mechanism such that the spacer and the first wheel are prevented from shifting along the axle, and with the spacer removable from the axle by temporarily removing the stop device from the axle, to allow the first wheel to shift along the axle, during use of the camera dolly on curved track.

* * * * *